(12) United States Patent
Tanner et al.

(10) Patent No.: US 8,893,425 B2
(45) Date of Patent: Nov. 25, 2014

(54) WILD TURKEY DECOY METHOD AND APPARATUS

(76) Inventors: Edward James Tanner, Amissville, VA (US); Wesley Jack Stanley, Brandy Station, VA (US); Corey Allen Stanley, Brandy Station, VA (US)

( * ) Notice: Subject to any disclaimer, the term of this patent is extended or adjusted under 35 U.S.C. 154(b) by 509 days.

(21) Appl. No.: 13/210,032

(22) Filed: Aug. 15, 2011

(65) Prior Publication Data

US 2013/0042515 A1 Feb. 21, 2013

(51) Int. Cl.
*A01M 31/06* (2006.01)

(52) U.S. Cl.
CPC ................................ *A01M 31/06* (2013.01)
USPC ................................................................ 43/2

(58) Field of Classification Search
CPC ............................ A01M 31/00; A01M 31/06
USPC ................................................. 43/2, 3; 104/53
See application file for complete search history.

(56) References Cited

U.S. PATENT DOCUMENTS

| | | | |
|---|---|---|---|
| 1,836,504 A | 12/1931 | Prince | |
| 2,252,795 A | 8/1941 | Weems et al. | |
| 2,624,144 A | 1/1953 | Beverman et al. | |
| 2,726,469 A | 12/1955 | Becker | |
| 3,754,759 A | 8/1973 | Breslow et al. | |
| 4,530,388 A | 7/1985 | Krueger | |
| 4,671,186 A | 6/1987 | Kunczynski | |
| 5,036,614 A * | 8/1991 | Jackson | 43/3 |
| 5,074,071 A | 12/1991 | Dunne | |
| 5,098,050 A * | 3/1992 | Bruns et al. | 43/3 |
| 5,233,780 A * | 8/1993 | Overholt | 43/2 |
| 5,289,654 A * | 3/1994 | Denny et al. | 43/2 |
| 6,079,140 A | 6/2000 | Brock, IV | |
| 6,138,396 A | 10/2000 | Capps | |
| 6,311,425 B1 | 11/2001 | Capps | |
| 6,408,558 B1 * | 6/2002 | Cornell et al. | 43/2 |
| 6,442,885 B1 | 9/2002 | Payne | |
| 6,574,902 B1 * | 6/2003 | Conger | 43/2 |
| 6,591,539 B2 | 7/2003 | Cosciani | |
| 6,708,440 B2 * | 3/2004 | Summers et al. | 43/2 |
| 6,957,509 B2 * | 10/2005 | Wright | 43/2 |
| 7,076,909 B2 * | 7/2006 | Heinn et al. | 43/2 |
| 7,975,422 B2 * | 7/2011 | Elliott et al. | 43/3 |
| 8,291,634 B2 * | 10/2012 | White | 43/2 |
| 8,479,436 B2 * | 7/2013 | Elliott et al. | 43/2 |
| 8,713,846 B1 * | 5/2014 | Thrash | 43/2 |

(Continued)

OTHER PUBLICATIONS

Custom Robotic Wildlife 2008 Catalog, Custom Robotic Wildlife Inc.. 2008, Mosinee, WI.

(Continued)

*Primary Examiner* — Darren W Ark
(74) *Attorney, Agent, or Firm* — Kile Park Reed & Houtteman (57) ABSTRACT

A wild turkey decoy apparatus including a plurality of guide track segments that are operable to be connected in series end-to-end and adjustably supported above a ground surface to provide a generally smooth and level vertical track guide surface. The guide track carries a base member that is driven by a rugged sprocket gear system for variable speed motion in a forward and reverse direction as controlled by a transmitter from a remote location. The base serves to support a decoy that is fitted with a plurality of internal servo motors that can be selectively operated from a remote location to duplicate the natural movement of decoy parts of a wild turkey.

13 Claims, 10 Drawing Sheets

(56) References Cited

U.S. PATENT DOCUMENTS

| | | | |
|---|---|---|---|
| 2004/0194365 A1* | 10/2004 | Summers et al. | 43/43.2 |
| 2009/0084018 A1 | 4/2009 | Elliott et al. | |
| 2009/0094877 A1* | 4/2009 | Smith | 43/3 |
| 2010/0077648 A1* | 4/2010 | Tucker, Jr. | 43/3 |
| 2011/0113672 A1* | 5/2011 | Holmberg | 43/2 |
| 2011/0232154 A1* | 9/2011 | Crank, Jr. | 43/3 |
| 2012/0053758 A1* | 3/2012 | McGregor et al. | 701/2 |
| 2012/0198752 A1* | 8/2012 | Steinhausen | 43/2 |
| 2012/0266775 A1* | 10/2012 | Buchta | 104/134 |

OTHER PUBLICATIONS

MTS 1000 Moving Target System Instruction Manual, GAMO, 2007, Ft. Lauderdale, FL.

* cited by examiner

WILD TURKEY DECOY METHOD AND APPARATUS

BACKGROUND OF THE INVENTION

This invention relates to apparatus for decoying wild avian game. More specifically, the invention comprises apparatus for luring wild turkeys, with a decoy, to a desired site as a part of a wild turkey hunt.

There are six subspecies of wild turkeys on the North American Continent with the most populous being an Eastern Wild Turkey which has a range covering the entire eastern half of the United States and into Canada. This subspecies was encountered by the Puritans, the founders of Jamestown and the Acadians. The Eastern Wild Turkey is a relatively large and is the most heavily hunted wild turkey subspecies.

Wild turkeys are omnivorous, foraging on the ground or climbing shrubs and small trees to feed. Males can reach thirty pounds and despite this weight are agile fliers and cunning—unlike domestic turkey counterparts. Wild turkey habitat is often an open woodland or savanna where they can fly under the top of trees. Eastern Wild Turkeys eat hard mast such as acorns, nuts, seeds and berries roots and insects. Occasionally wild turkeys have been known to consume amphibians and small reptiles such as lizards and snakes.

Wild turkeys are very cautious birds with excellent eyesight and will fly or run at the first sight of danger. The combination of excellent eye sight and a cunning, but cautious, disposition make wild turkey hunting in the United States a particularly rewarding experience when done properly. Wild turkeys are usually hunted with shotguns but occasionally are taken by skillful use of bow and arrow gear. Bow hunting wild turkeys, however, is virtually impossible without an equally skillful understanding of deployment and sophisticated utilization of decoys.

Depending on state regulations wild turkeys are usually hunted in the spring and fall. The spring is mating season and male turkeys are hunted while fall hunts are often focus on both male and female. Wild male turkeys "toms" are polygamous—mating with as many hens as possible. Males may be seen courting in groups with a dominant male puffing out its feathers, spreading its tale and dragging its wings to attract females. In nature once a dominant tom flies down in the early morning, gobbles and struts hens will be attracted. The theory of courting in groups is that a dominant male is able to attract enough females such that less dominate males then have a greater chance of sharing their genetic material than if they were courting alone.

It has been determined through experiment and experience that decoy hunting wild turkeys, although very challenging, can be reliably successful. The concept is to create a decoy in sound and movement that is attractive to a target of interest. In this if a tom decoy is used and movement and sound is skillfully employed hens, jakes (young males) and other toms can be attracted within hunting range notwithstanding the excellent sight and flight tendency of wild turkeys—as noted above.

Although calling wild turkeys by imitating male gobbling, clucks, putts, purrs, yelps, cuts, whines, cackles and kee-kees by hunters in camouflage gear has produced a degree of successful results this process has obvious limitations of human skill and patience.

In addition numerous stationary hen, jake and tom decoys have been envisioned in the past mounted upon stakes that are driven into or positioned upon a ground surface (viz. U.S. Pat. Nos. 4,965,953; 5,036,614; 5,168,649; 5,233,780; 5,274,942; 5,289,654; 5,459,958; 5,515,637; 6,070,356; 6,092,322 and US 2001/0004812). Although such decoys are often provided with head turning, body rocking, rotating or oscillating motion, which is some instances is remotely controlled, wild turkey eyesight and natural caution makes stationary decoys of limited practical effectiveness.

In addition wild turkey decoys have been suspended from tree limbs in mobile arrangements (U.S. Pat. No. 5,832,649) relying on wind currents to impart random movement. Although relatively inexpensive and easily mounted such designs also lack a significant degree of realism that impairs their utility.

At least two other wild turkey decoy designs have included radio frequency controlled body motion functions as well as a degree of ambulatory movement—one with a linear track way (U.S. Pat. No. 6,408,558) and another with a wheeled carriage (U.S. Pat. No. 6,708,440) that is driven by a drive pulley. A linear track tends to be somewhat unnatural because in nature few wild turkeys walk back and forth in a straight line. A wheeled carriage design provides an opportunity for varied motion but as a practical matter a wheeled carriage is of limited utility in natural wild turkey habitat where the ground surface is rarely even and often covered with clump grass and/or weeds that will impede normal wheeled movement.

It would be highly desirable to provide a wild turkey decoy apparatus that would be realistic and variable with an ability to accommodate daily hunting circumstances, terrain and recently observed tendencies of wild turkeys. Moreover it would be desirable to provide a decoy apparatus that is highly rugged and practical to operate over a season of hunting in varied terrain conditions, temperature and adverse weather circumstances.

The problems and desires suggested in the preceding regarding wild turkey hunting with man-made decoys are not intended to be exhaustive but rather are among many which may tend to reduce the effectiveness and reliability of wild turkey decoy hunting techniques and systems appearing in the past. Other noteworthy problems may also exist; however, those presented above should be sufficient to demonstrate that successful wild turkey hunting known in the past, using man-made decoys, will admit to worthwhile improvement.

THE DRAWINGS

Numerous advantages of the present invention will become apparent from the following detailed description of preferred embodiments taken in conjunction with the accompanying drawings wherein.

DETAILED DESCRIPTION

Context of the Invention

Figure 1:
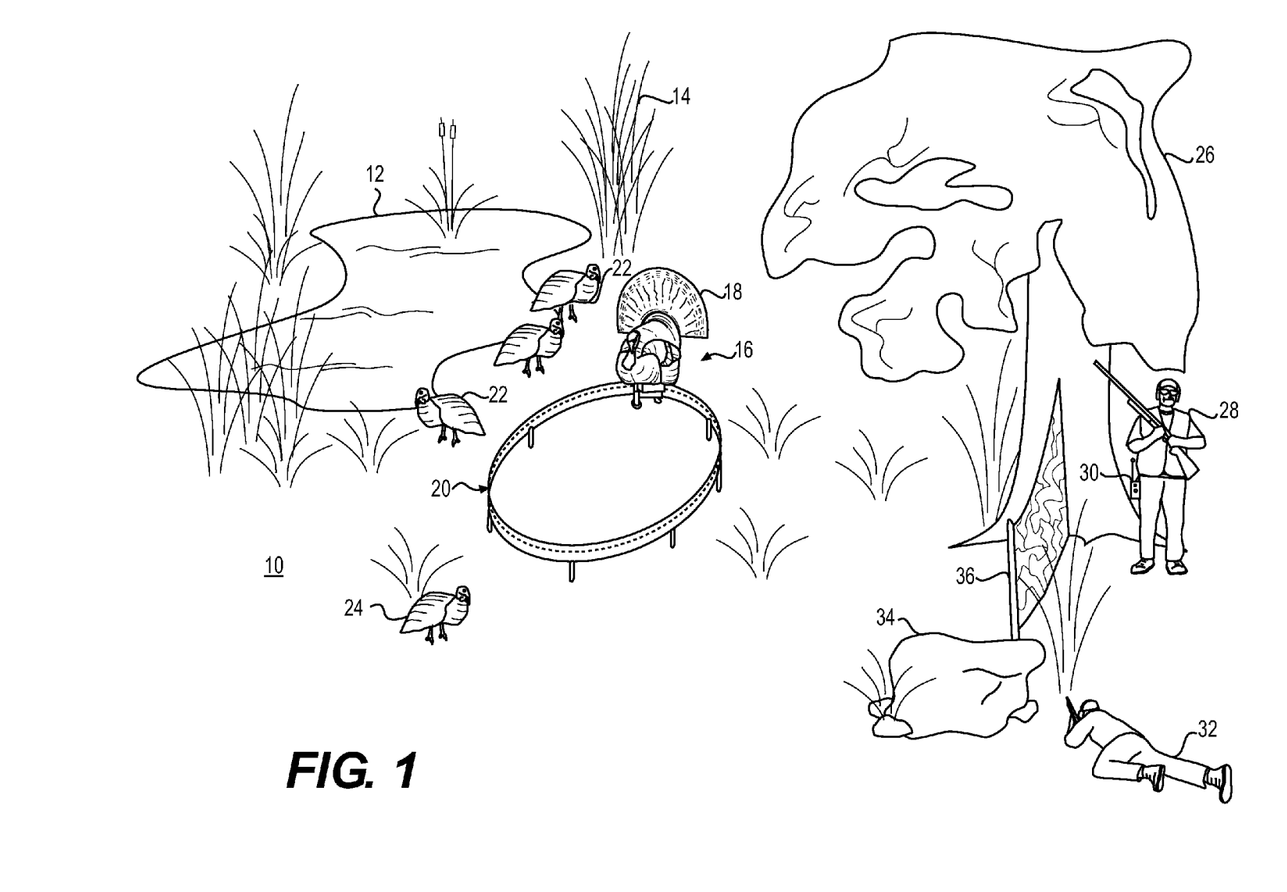
FIG. 1 is a pictorial view of a turkey hunting context of the invention where one or more turkey decoys are positioned in a location of likely wild turkey habitat and hunters are positioned in an adjacent location in order to calling wild turkeys while a hunter waits in a concealed location behind a tree an operates a control for an animated decoy.

Turning now to the drawings wherein like numerals indicate like parts FIG. 1 is a pictorial view of an operating context of the invention. In this a relatively open ground wild turkey habitat 10 may include a pond or casual water 12, along with general aquatic shore vegetation such as small bushes, cattails, tall grasses and the like. Adjacent to such a relatively open region a wooded area may include under bush and low tree branches suitable for wild turkeys to perch in the trees. Moreover, wild turkey habitats can be somewhat hilly and experienced hunters usually like to position themselves above a wild turkey lure zone.

The habitat 10 and a wild turkey decoy apparatus 16 depicted FIG. 1 is in accordance with one embodiment of the invention which shows a tom turkey decoy 18 mounted upon a closed loop rail system 20. In this view the tom decoy has been successful in attracting the interest of four female turkeys or hens 22 as well as a less dominant tom or even a jake (not shown) that might envision participation in a genetic material disposition process.

Positioned behind a tree 26 is a first hunter or shooter 28. The shooter has within his control a radio frequency control device 30 operable to control movement of the wild tom decoy as will be discussed below. In addition a second hunter 32 can be positioned in a prone or sitting position behind a rock 34 to assist the shooter 28 by calling the prey with tom decoy calls or sounds. In some instances an additional camouflage panel 36 is erected as necessary or desirable to complete isolation of the hunters from the keen eyesight and cunning disposition of wild turkeys.

Ambulatory Wild Turkey Decoy Apparatus

Figure 2:
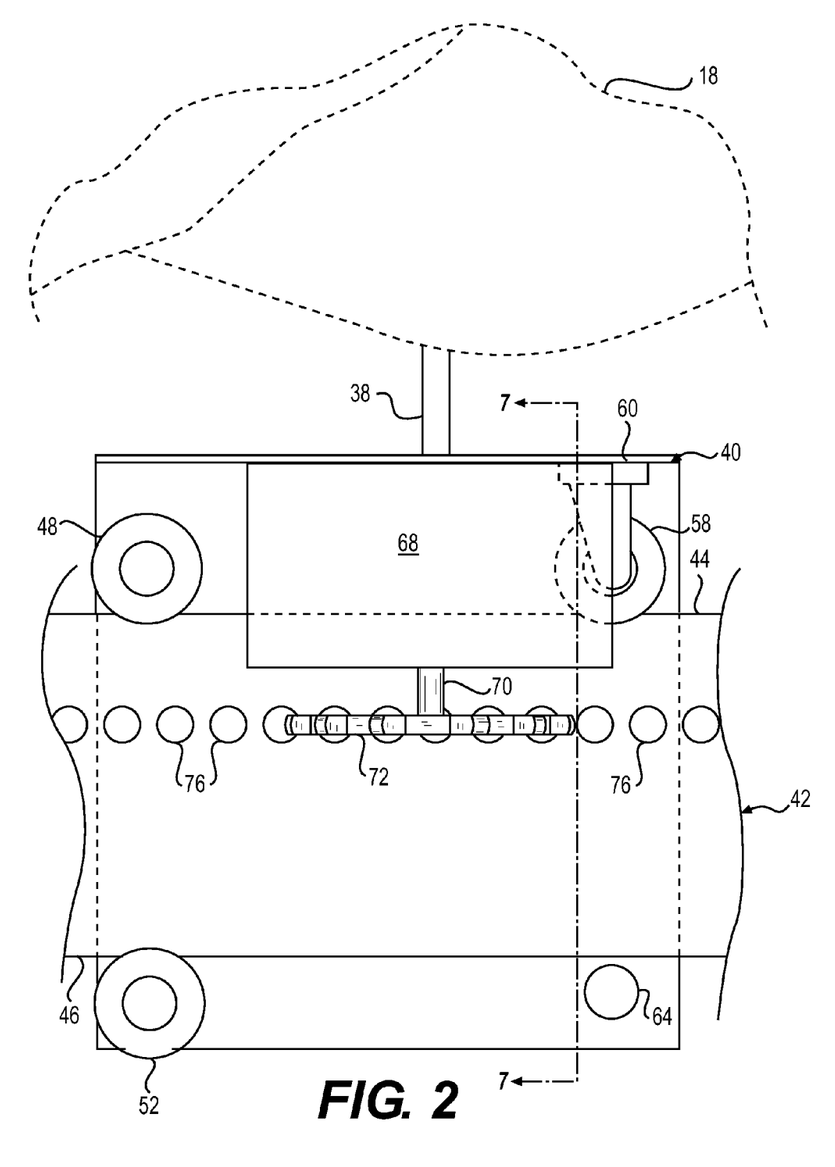
FIG. 2 is a side elevational view of an animated wild turkey decoy control and drive unit mounted upon a guide rail path.
Figure 3A:
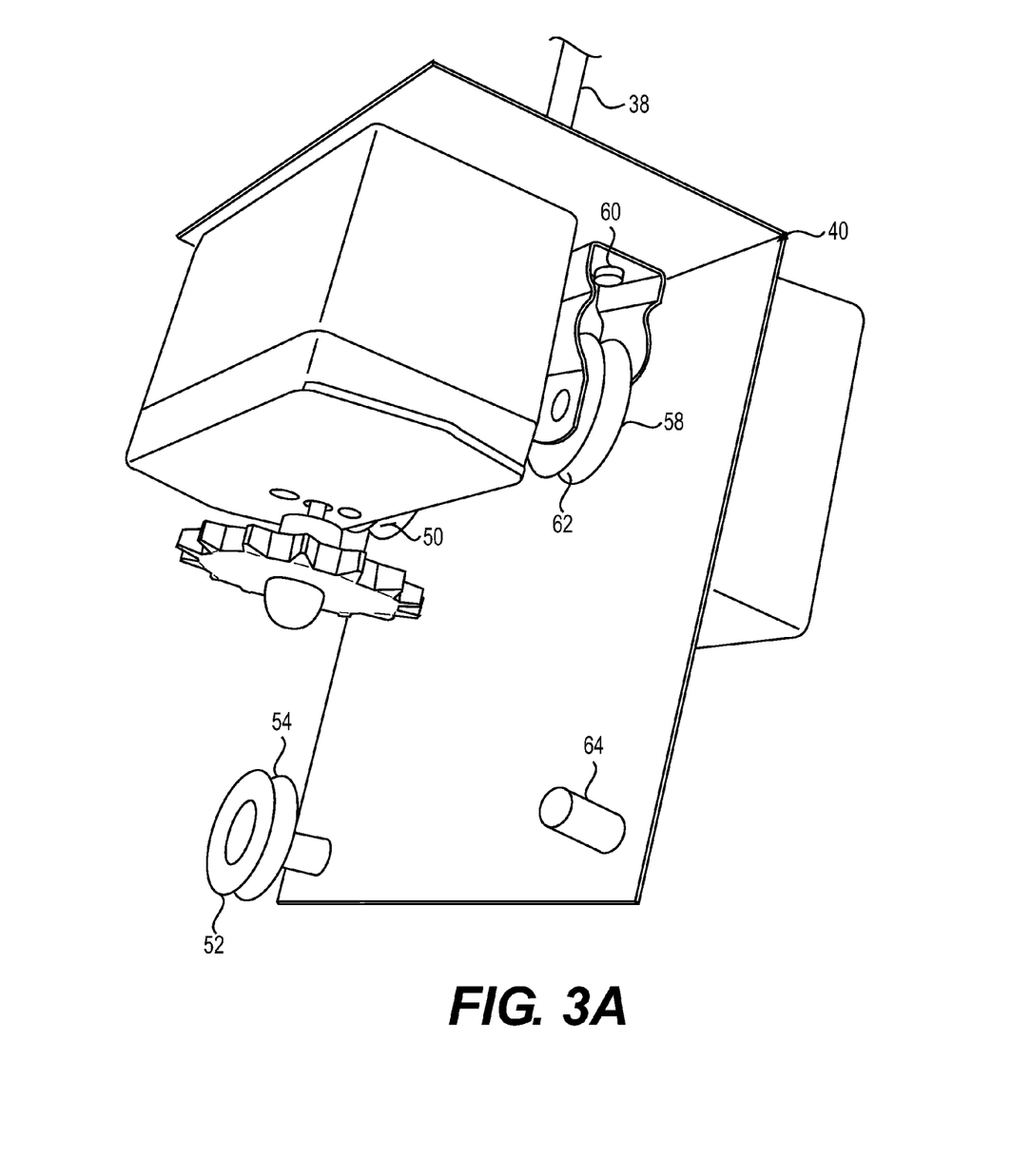
FIG. 3A is an axonometric view of the decoy depicted in FIG. 2 disclosing operative components of a portion of the invention.
Figure 3B:
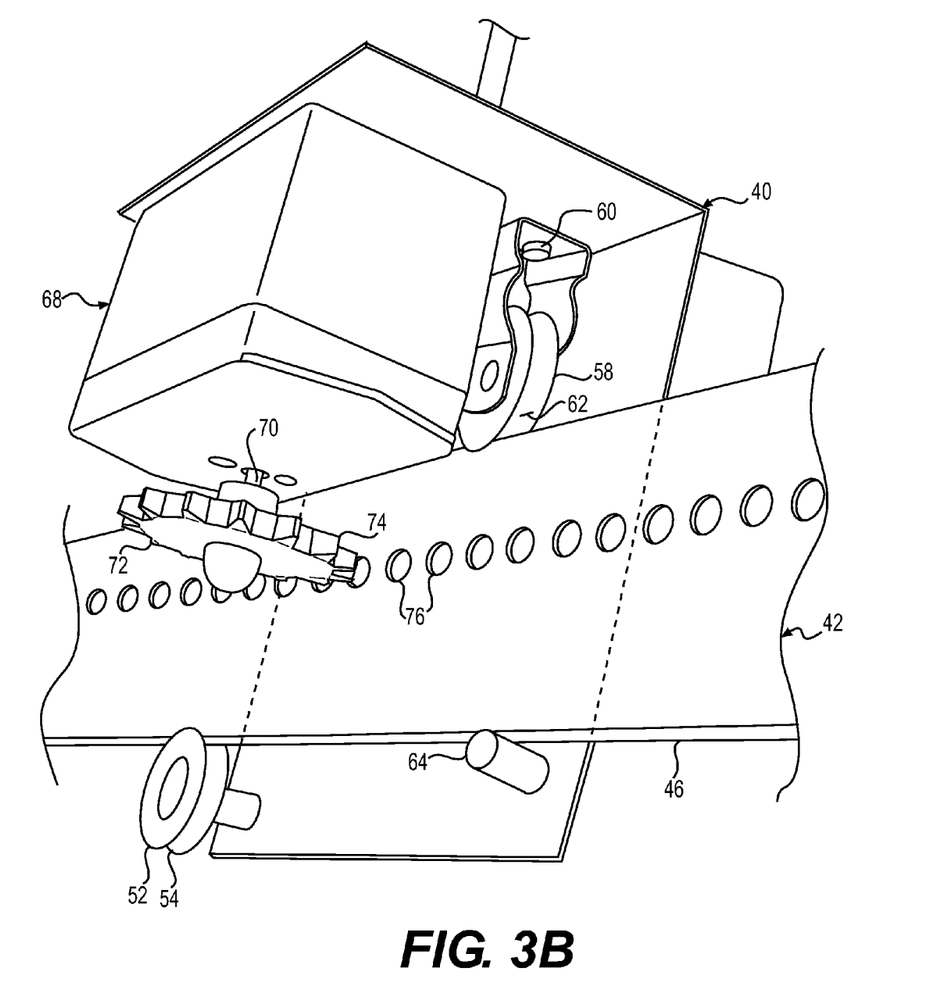
FIG. 3B is an axonometric view similar to FIG. 3A and disclosed the animated wild Turkey decoy mounted upon a guide rail.

Referring now particularly to FIGS. 2, 3A and 3B of the drawings a wild turkey decoy 18 is connected to an upright stanchion 38 which in turn is mounted upon a generally L-shaped base member 40. The base member 40 is operable to be mounted upon a guide track band 42 of the guide rail system 20. In this the guide track 42 is provided with an upper, accurate, convex surface 44 and a lower accurate, convex surface 46.

Figure 4:
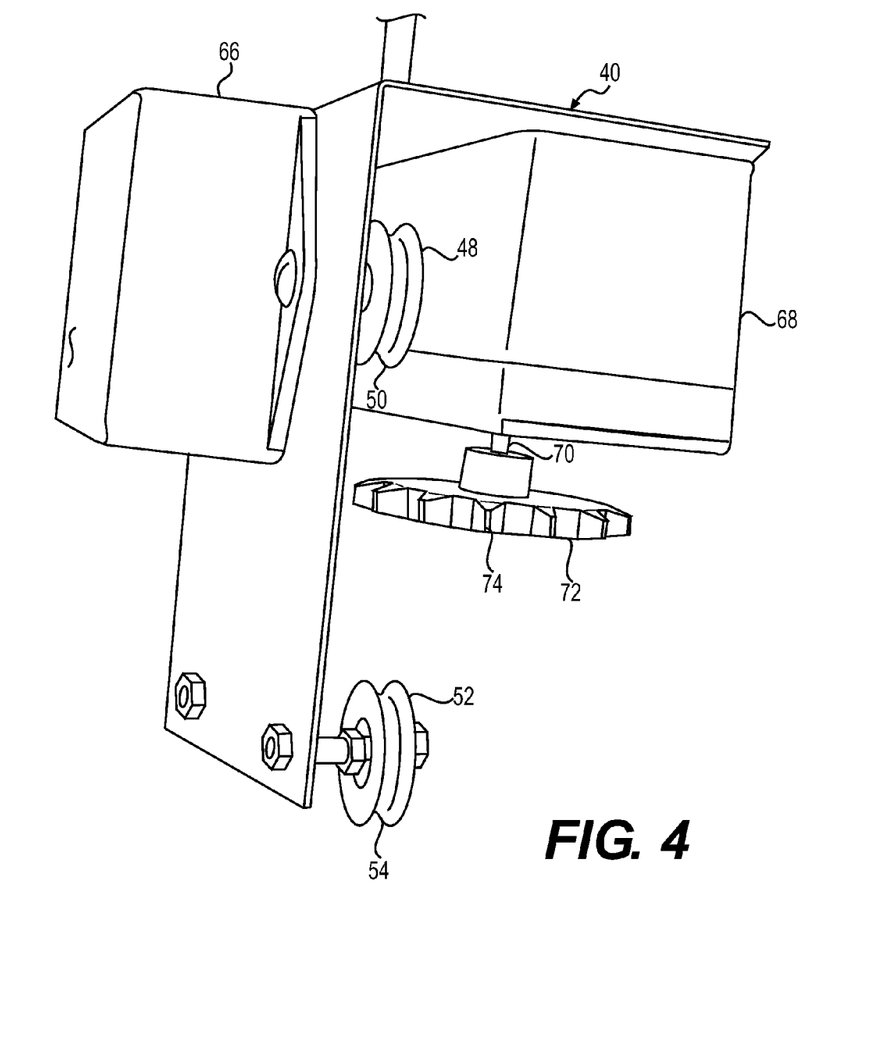
FIG. 4 is another axonometric view of the control and drive of an animated wild turkey drive as depicted in FIGS. 3A and 3B from a different perspective.
Figure 5:
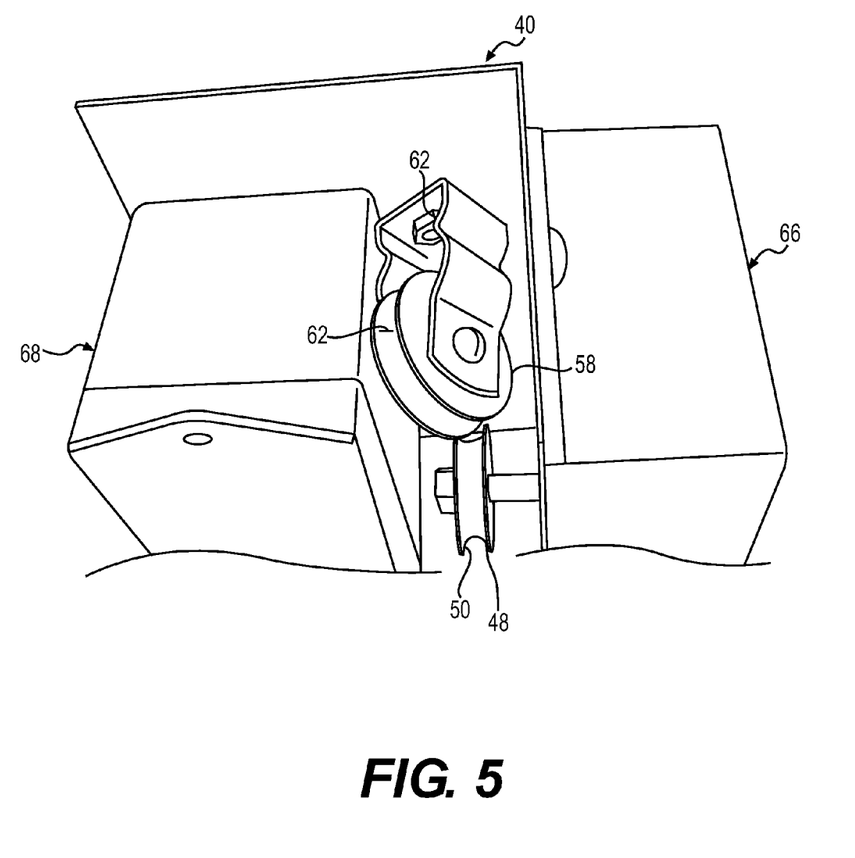
FIG. 5 is a partial detailed view disclosing a pivotal guide wheel of the animated wild turkey decoy apparatus.

A first wheel 48 is rotationally mounted upon the base member 40 and has an accurate, concave, peripheral surface 50, note FIG. 3A, FIG. 4 and FIG. 5, for rolling engagement with the compatibly dimensioned accurate, convex, upper surface 44 of the guide track band 42. A second wheel 52 is mounted for rotation upon a lower portion of the L-shaped base 40 in a position on the base 40 in general, vertically aligned, opposition to the first wheel 48. The second wheel has an accurate, concave peripheral surface for rolling engagement with a compatibly dimensioned accurate, convex, lower surface 46 of the guide track 42.

In a laterally offset posture from the first and second opposing wheels 48 and 52 is a third guide wheel 58 which is pivotally mounted as at 60 to the L-shape base 40 and has a peripheral, accurate, concave surface 62 which functions to ride upon the compatibly dimensioned, accurate, convex surface 44 of the guide rail 42. The pivotal mounting 60 facilitates tracking movement of the wheel 58 upon the guide track 42 around curves and corners of the closed loop guide track 42. The first wheel 48 is shown as being mounted for rotation upon a fixed axis, however, the first wheel may also be pivotally mounted in a manner similar to the mounting of the third wheel at 60 to facilitate smooth back and forth guided motion of the base 40 upon the closed loop guide track 42

In a position opposing the third wheel 58 is a guide post 64 which is normally mounted upon the base 40. The guide post 64 serves to maintain engagement of the wheel 58 in secure rolling contact with the upper surface 44 of the guide track 42. Alternatively the guide post 64 could be a fourth wheel arrangement similar to wheel 52 with an accurate, concave, peripheral surface operable to securely engage a compatibly dimensioned convex lower surface 46 of the guide track 42.

The base 40 carries a battery pack 66 which in one embodiment utilizes eight AA batteries. The base further carries a relay, control and drive unit 68 which includes in one embodiment a 12 volt fractional horse power D.C. motor. A motor shaft 70 is fitted with a sprocket drive wheel 72 having a plurality of individual drive sprockets 74. The drive wheel 72 is operable to be selectively driven in either direction from controlled rotation of the drive motor.

The guide track band 42 is fashioned with a sequence of apertures 76 in series at a selected distance from the upper edge 44 of the guide track band 42. The apertures are spaced to receive compatibly dimensioned sprocket teeth 74 of the drive wheel 72. Accordingly as the fractional horse power D.C. motor is selectively actuated and the sprocket wheel 72 is rotated the base 40 is translated along the closed loop guide track 42 in either direction and at selectively variable speeds.

Figure 6:
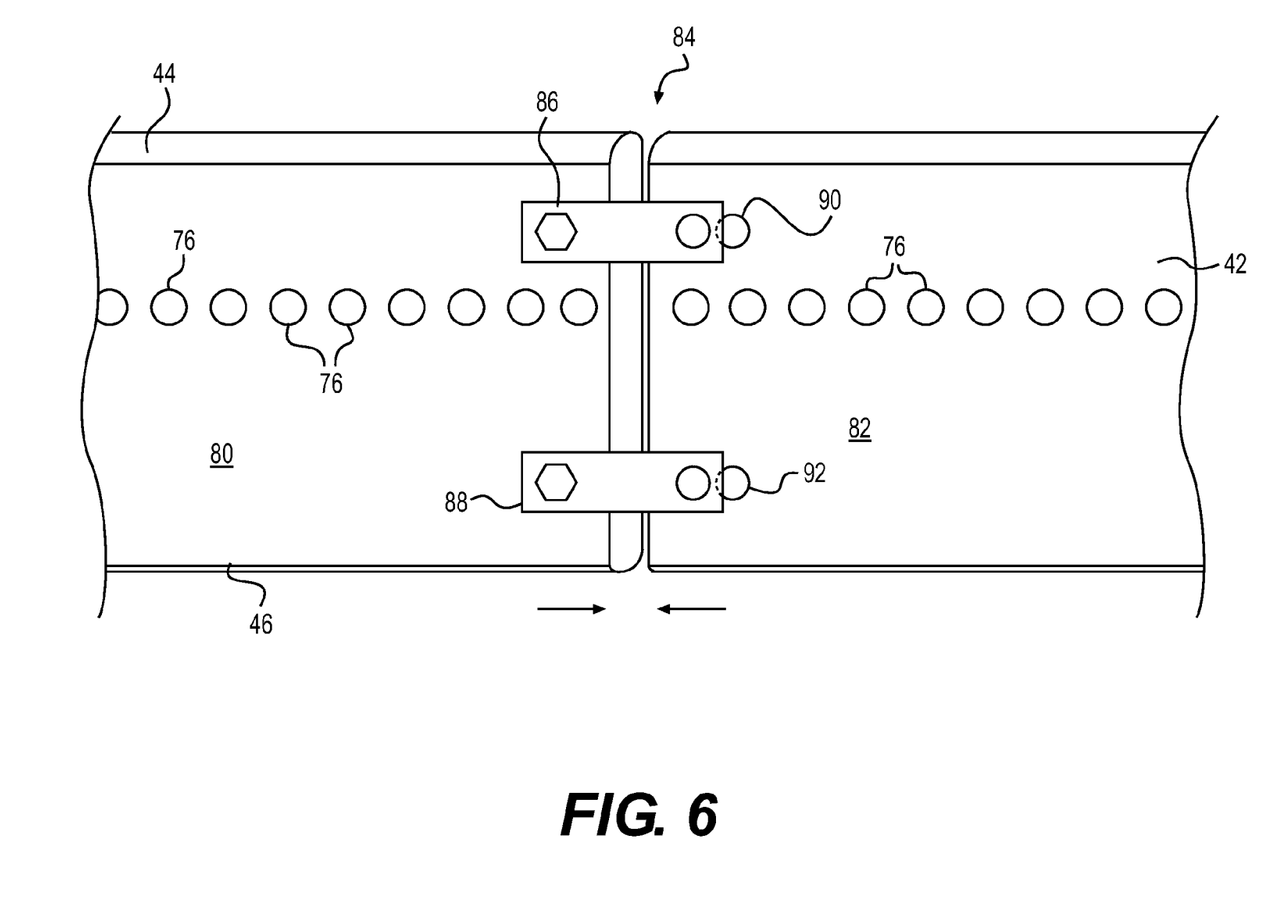
FIG. 6 is an axonometric of a connection junction of adjacent segments of the guide rail showing the secure and rugged connection mechanism of adjacent rail segments.

The guide track 42 is preferably composed of an elongate length (approximately twelve feet or more) of a heavy gage high density polyethylene ("HDPE") strip fashioned from quarter inch thick stock and with approximately four inches in breath. As shown in FIG. 6 adjacent end segments 80 and 82 are abutted together in the direction of the arrows and upper and lower locking bars or heavy duty strips 86 and 88 are bolted onto and extend from one segment 80 with distal ends that engage an opposing end portion of an adjacent segment 82 which in turn are bolted in place through apertures 90 and 92 in the end of the adjacent segment 82. This latch arrangement ruggedly secures the two segments together and longitudinally aligns the ends of the segments so that the upper 44 and lower 46 convex accurate edges of the guide track 42 are essentially seamless to rolling movement of the base guide wheels 48, 52 and 58. Alternately, the guide track 42 can be composed of a plurality of track segments with opposing ends of each pair of segments being joined as illustrated in FIG. 6.

Figure 7:
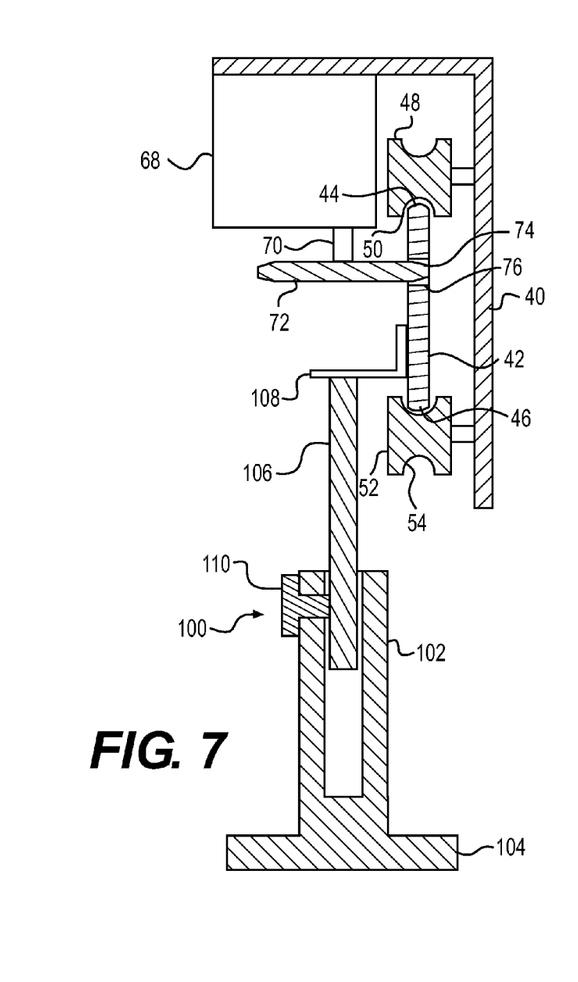
FIG. 7 is a partial cross-sectional view of an adjustable length support system as well as a disclosure of wheel segments mounted upon a closed loop guide track.

Referring to FIG. 7 there is a partial cross-sectional view showing the convex upper rail portion 44 in secure engagement with a compatibly dimensioned peripheral concave recess in guide wheel 48. In a similar manner the second opposing wheel 52 is securely guided upon a lower accurate, convex surface 46 of the guide track 42 to secure the base 40 upon the guide track 42.

The guide track band 42 is positioned above a ground surface in the embodiment of FIG. 7 with a plurality of telescoping, variable height stanchions 100. Each stanchion included a base member 102 that has an enlarged ground engaging pad 104 and an upright column to receive a vertical positioning rod 106 which is connected to the an inside portion of the guide track band 42 by a cantilever arm 108. Vertical adjustment is provided by a wing nut set screw 110 as shown in FIG. 7. Alternatively a top portion of the base member 102 can receive one or more vertical slots and a surrounding sleeve with a cam lock can function to bind the sleeve to the rod 106 and secure the vertical height of the stanchion 100 with respect to the ground surface. Each guide track band segment is fitted with one or more stanchion units so that the entire closed loop guide track 20 can be supported upon an uneven ground surface in a generally level, horizontal posture.

Figure 8:
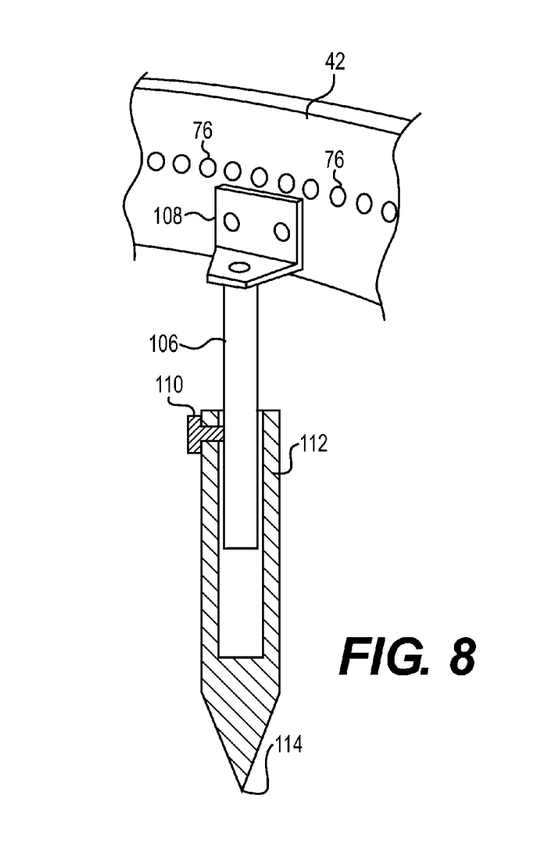
FIG. 8 is an axonometric view of an adjustable length mounting stanchion that penetrates a ground surfaced that operably supports the guide track above a ground surface.

FIG. 8 discloses an alternative preferred embodiment where the ground engaging base member 102 is fashioned with a pointed tip 114 that can be driven into a ground surface to secure the base member 112. A desired height of the guide track 42 above a ground surface is then determined and the height is held in operative position by selective application of the height adjustment mechanisms, such as a wing nut set screw or sleeve with a cam lock arrangement as discussed above.

Figure 9:
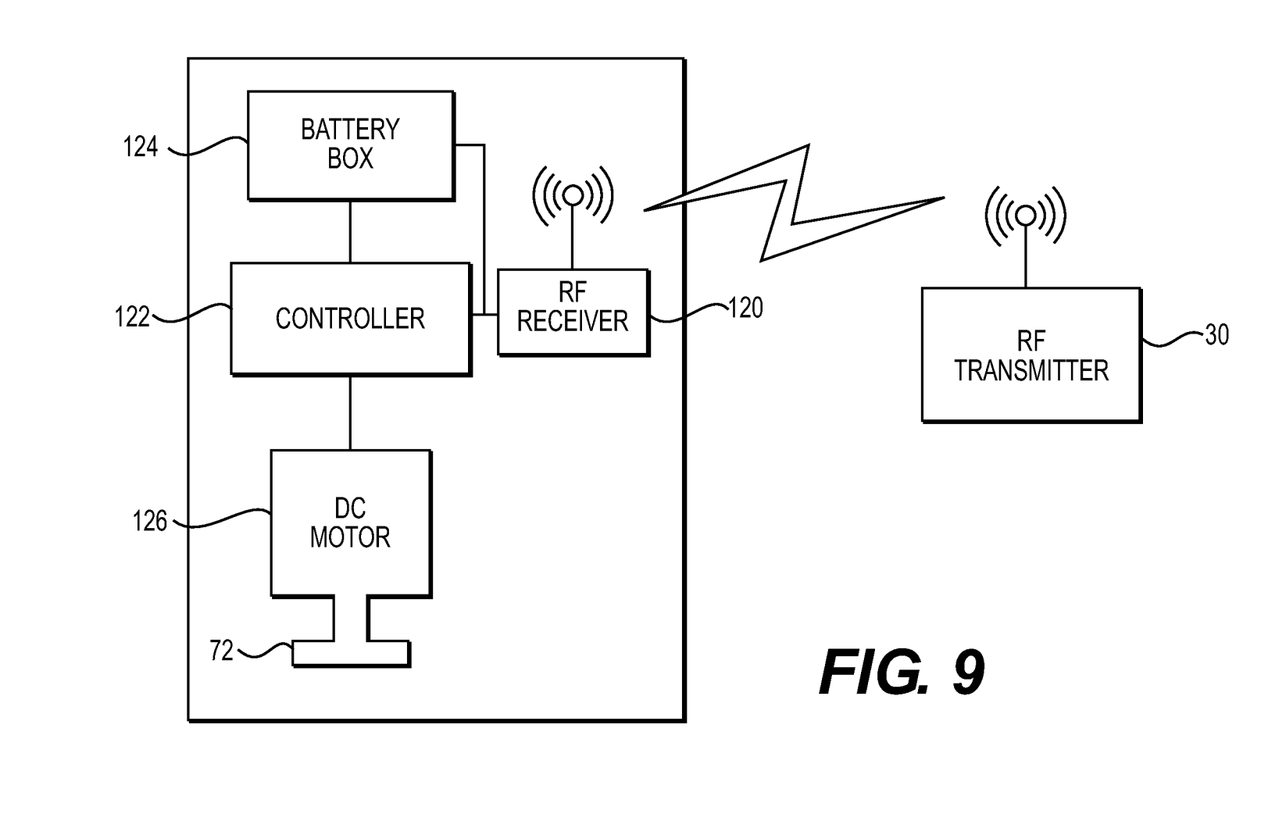
FIG. 9 is a schematic view of a control and drive network for the animated wild turkey decoy apparatus of the subject invention.

Referring now to FIG. 9 a remote control system of the subject wild turkey decoy device is shown. In this a remote radio frequency hand unit 30 is held and operated by a shooter 28, note again FIG. 1, or his/her hunting companion 32. Signals from the battery powered transmitter are received by a radio frequency receiver 120 mounted on the base 40 of the decoy as discussed above. The signals are then relayed to a controller 122 which in turn actuates applies selective direct current from the battery 124 to selectively drive the D.C. motor 126 and sprocket gear 72. The direction and speed of the drive can be varied and thus the decoy 18 is selectively operable to be driven by the hunter operating the controller to mimic motions of a natural wild turkey.

Figure 10A:
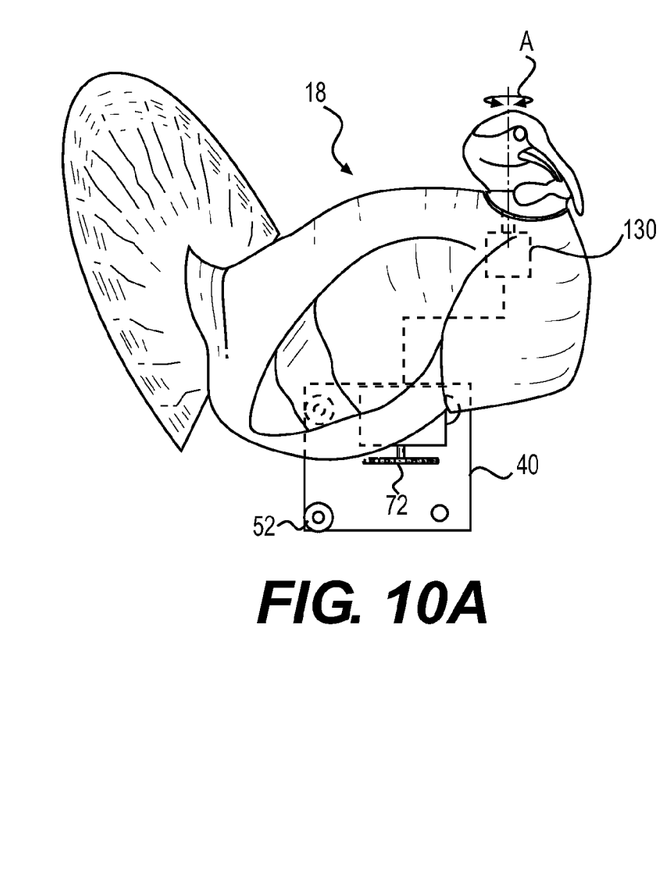
FIGS. 10A and 10B disclose a tom turkey decoy mounted upon a drive unit disclosing various motions that can be performed by the animated wild turkey decoy.
Figure 10B:
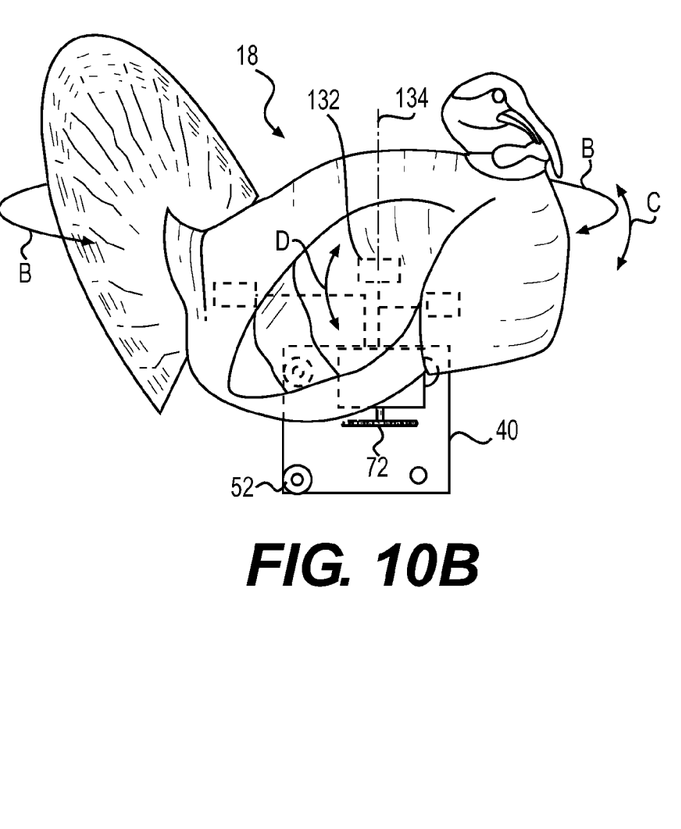

Referring now to FIGS. 10 A and B illustrative motions of the wild turkey decoy are illustrated. In this a servo motor 130 can be mounted within the wild turkey decoy to provide selective rotation of the decoy head as illustrated by directional arrows "A." In addition internal servo motor 132 can be utilized to selectively rotate the decoy about a generally vertical axis 134 in the general direction of directional arrows "B." In addition a hunter operating the control transmitter 30 can remotely actuate a servo motor 136 to produce rocking motion of the decoy in the general direction of arrows "C." In a similar manner the decoy wings can be actuated with internal servo motors actuated under the control of the RF transmitter 30 to selectively move the wild turkey wings generally distended or withdrawn as indicated by directional arrows "D" in FIG. 10B. Still further the tail feathers can be actuated under the control of further servo motors (not shown) but under the control of the hunters to mimic natural movement of wild turkeys.

Method of Operation

As a general rule applicants like to hunt wild turkeys from a position of at least some elevated terrain with respect to a decoy site. A decoy site is selected to include a generally level terrain with low to moderate height of bushes and grasses that are adjacent to natural tree and/or rock cover. The decoy apparatus is constructed by determining a desired path of decoy travel. In this, although FIG. 1 shown an elliptical path the path of the rail 42 can be varied to suit the terrain. Once the general configuration of the guide track is selected the track segments are fitted end-to-end in series and the support stanchions are vertically adjusted to create a relatively level and smooth top rail surface 44 of the guide track 42.

The base 40 lower wheel 52 and guide rod or additional wheel 64 is then removed and the base is mounted upon the guide rail 42 and the wheel and guide are reattached to firmly support the base 40 on the guide track 42. Movement of the base is then tested for smooth performance and all of the forward and backward and variable speed functions under the remote control of the transmitter 30.

Next the decoy carrying a plurality of servo motors is mounted upon the base and the base is again tested for forward and back motion as well as varying speed. In addition all of the decoy motions are then tested as actuated again by the remote transmitter 30 from a distance of intended cover for a hunter such as behind a tree or rock.

As a general rule wild tom turkeys tend to gobble on a roost in the early morning. They do this to announce their presence to surrounding females during a spring breeding season— such as early April through mid-May. A hunter then positioned upstream of the wild turkeys and the decoy site will call the wild turkeys toward the decoy with a variety of turkey calls and sounds. In addition another hunter selectively operates the remote transmitter 30 to vary the direction and speed or a decoy on the guide track as well as various wild turkey body functions such as spreading tail feathers, distending wings, rotating the head, forward and reverse rocking and pivoting in a manner designed to duplicate the natural movement of wild turkeys in nature.

The decoy is selected to produce a desired hunting effect. In this in some instances a jake (juvenile male) is used as a decoy. The theory is that spring turkeys are constantly trying to establish dominance. Therefor when a tom sees a jake decoy in motion he immediately approaches them to show the jake who is boss. Alternatively in some instance it is desirable to use a full strutting tom as a decoy. The theory behind use of a tom decoy is that females will be attracted and other males (jakes and toms) will then be attracted to the hens.

The functions and advantageous of the subject wild turkey decoy system provides a rugged and natural decoy system that enables a hunter to effectively mimic the motion and habits of turkeys in the wild. The adjustable guide track system enables a hunter to use the apparatus in varied terrain conditions to effectively decoy wild turkeys into a desired hunting site.

In describing the invention, reference has been made to a preferred embodiments. Those skilled in the art, however, and familiar with the disclosure of the subject invention may recognize additions, deletions, substitutions, modifications and/or other changes which will fall within the purview of the invention as defined in the following claims. In the claims reference has been made to use of the term "means" flowed by a statement of function. When that convention is used applicants intend the means to include the specific structural components recited in the specification and drawings and in addition other structures and apparatus that will be recognized by those of skill in the art as equivalent structures for performing the recited function and not merely structural equivalents of the structures as described and shown.

What is claimed is:

1. A wild turkey decoy apparatus comprising:
a guide track operable to be disposed upon a ground surface of intended wild turkey attraction, said guide track comprising a closed loop guide track composed of a plurality of guide track segments connected in series and means for mounting said closed loop guide track at a desired height above a ground surface;

a base for supporting a wild turkey decoy connected to said guide track and having means for guiding movement of said base upon said guide track, said means for guiding movement of said base upon said guide track comprises at least one first wheel means mounted for rotation upon said base and being operable for engagement with an upper guide track surface of said closed loop guide track and at least one second wheel means mounted for rotation upon said base in a posture opposing said at least one first wheel means, said at least one second wheel means being operable for engagement with a lower guide track surface of said closed loop guide track for guiding controlled movement of said base upon and along said guide track, said at least one first wheel means comprises a wheel having a concave peripheral track engaging surface fashioned upon the peripheral surface of said at least one first wheel means and being dimensioned to ride upon and receive within said concave peripheral surface an upper edge of said upper guide track surface of said closed loop guide track;

means connected to said base for driving movement of said base upon said track;

a remote controller for transmitting instruction signals to said means for driving movement of said base upon said guide track;

control means connected to said base for receiving instruction signals from said remote controller for driving movement of said base upon said guide track; and a wild turkey decoy connected to said base wherein remote instructions can be operably transmitted to said control means for imparting selective movement of said wild turkey decoy in a location of intended wild turkey attraction.

2. A wild turkey decoy apparatus as defined in claim 1 wherein said means connected to said base for driving movement of said base upon said guide track comprises:

a direct current motor connected to said base, said direct current motor having an axle operable for rotation upon application of direct current to said direct current motor; and a sprocket wheel connected to said direct current motor axle and said sprocket wheel having sprockets operable for driving engagement with a plurality of apertures positioned in series along said closed loop guide track for driving movement of said base upon said guide track.

3. A wild turkey decoy apparatus as defined in claim 1 wherein said control means comprises:

means for controlling drive movement of said means connected to said base for driving movement of said base upon said guide track in a selected direction upon said guide track in a first direction or a second opposite direction with respect to the first direction.

4. A wild turkey decoy apparatus as defined in claim 3 wherein said control means comprises:

means for controlling drive direction and speed of said base upon said guide track.

5. A wild turkey decoy apparatus as defined in claim 4 and further comprising:

means for producing and selectively controlling oscillation movement of a body of said wild turkey decoy connected to said base.

6. A wild turkey decoy apparatus as defined in claim 5 and further comprising:

means for producing and selectively controlling oscillation movement of a head portion of said wild turkey decoy.

7. A wild turkey decoy apparatus as defined in claim 1 wherein said at least one second wheel means comprises:

a wheel having a concave peripheral surface fashioned within said at least one second wheel means and being dimensioned to receive within said concave peripheral surface a lower edge of said lower guide track surface of said closed loop guide track.

8. A wild turkey decoy apparatus as defined in claim 7 wherein said means for guiding movement of said base upon said guide track further comprises:

a guide wheel means mounted upon said base for rotational and pivotal movement and having a concave peripheral surface of said guide wheel means and being operable for engagement with said upper guide track surface of said closed loop guide track.

9. A wild turkey decoy apparatus as defined in claim 8 wherein said means for guiding movement of said base upon said guide track further comprises:

tracking means connected to said base in a posture opposing and below said guide wheel means, said tracking means being operable for engagement with said lower guide track surface of said closed loop guide track for maintaining engagement of said guide wheel means with said upper edge of said upper guide track surface of said closed loop guide track during movement of said base upon said closed loop guide track.

10. A wild turkey decoy apparatus as defined in claim 9 wherein said tracking means comprises:

a post connected to said base and extending approximately normal to and beneath a path of the lower edge of said lower guide track surface of said closed loop guide track.

11. A wild avian decoy apparatus comprising:

a closed loop guide track operable to be disposed above a ground surface of intended wild avian decoy attraction, said closed loop guide track is composed of a plurality of guide track segments connected in series together to form a closed loop, said closed loop guide track being supported above a ground surface by a plurality of legs connected to said guide track and extending to a ground location beneath said guide track for supporting the guide track loop above the ground surface and a plurality of apertures formed through said closed loop guide track;

a base operable for supporting a wild avian decoy, said base being connected to said guide track;

a direct current motor and sprocket gear set connected to said base for driving movement of said base upon said guide track, wherein said apertures are operable to receive in driving engagement sprockets of said sprocket gear set connected to said base;

a control connected to said base and said direct current motor for receiving signals from said remote controller and directing direct current to said motor for driving movement of said base upon said guide track; and a wild avian decoy connected to said base wherein remote instructions can be operably transmitted to said control for imparting selective movement of said wild avian decoy in a location of intended wild avian decoy attraction.

12. A wild avian decoy apparatus as defined in claim 11 wherein:

said base being mounted upon said closed loop guide track by a first wheel mounted upon said base and having a concave peripheral outer surface for riding engagement with an upper edge of said closed loop guide track; and said base being further mounted upon said closed loop guide track by a second wheel mounted upon said base in a position opposing said first wheel and having a concave peripheral outer surface for guiding engagement with a lower edge of said closed loop guide track.

13. A wild avian decoy apparatus as defined in claim 12 and further comprising:
- a guide wheel mounted upon said base for rotational and pivotal movement and having a concave peripheral surface of said guide wheel and being operable for engagement with said upper edge of said closed loop guide track; and
- a tracking member connected to said base in a posture opposing and below said guide wheel, said tracking member being operable for engagement with a lower edge of said closed loop guide track for maintaining engagement of said guide wheel with said upper edge of said closed loop guide track during movement of said base upon said closed loop guide track.

* * * * *